United States Patent
Schneider et al.

(10) Patent No.: US 11,170,517 B2
(45) Date of Patent: Nov. 9, 2021

(54) METHOD FOR DISTANCE MEASUREMENT USING TRAJECTORY-BASED TRIANGULATION

(71) Applicant: Dr. Ing. h.c. F. Porsche Aktiengesellschaft, Stuttgart (DE)

(72) Inventors: Christian Schneider, Tuebingen (DE); Constantin Haas, Pulheim (DE); Tim Kunz, Kelkheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 736 days.

(21) Appl. No.: 16/059,081

(22) Filed: Aug. 9, 2018

(65) Prior Publication Data

US 2019/0220988 A1 Jul. 18, 2019

(30) Foreign Application Priority Data

Jan. 18, 2018 (DE) ...................... 10 2018 101 023.0

(51) Int. Cl.
*G06T 7/521* (2017.01)
*G01B 11/02* (2006.01)
(Continued)

(52) U.S. Cl.
CPC ............ *G06T 7/521* (2017.01); *G01B 11/026* (2013.01); *G01C 3/00* (2013.01); *G01S 17/08* (2013.01);
(Continued)

(58) Field of Classification Search
CPC ........ G01S 17/931; G01S 17/08; G01S 17/58; G01B 11/026; G01C 3/00; G01C 11/06; G06K 9/00791
See application file for complete search history.

(56) References Cited

U.S. PATENT DOCUMENTS

| | | | |
|---|---|---|---|
| 2010/0046801 A1* | 2/2010 | Ishiyama | ................. G01C 3/08 382/106 |
| 2014/0002610 A1 | 1/2014 | Xi et al. | |

(Continued)

FOREIGN PATENT DOCUMENTS

| | | |
|---|---|---|
| DE | 102010039092 A1 | 3/2011 |
| DE | 102015122172 A1 | 6/2017 |

(Continued)

*Primary Examiner* — Girumsew Wendmagegn
(74) *Attorney, Agent, or Firm* — Leydig, Voit & Mayer, Ltd.

(57) ABSTRACT

A method for ascertaining a distance between a vehicle and a projection surface, onto which a characteristic light pattern is projected using a headlight of the vehicle, includes detecting, in an image of the characteristic light pattern captured by an image capturing unit, a characteristic structure produced by a first light-producing unit by evaluating a geometric location relationship in the captured image between the trajectory and characteristic structures of a characteristic light pattern that are located in an environment along the trajectory; calculating a point on the ray path that is correlated with a position of the detected characteristic structure on the trajectory in accordance with the transformation rule; and calculating the distance between the vehicle and the projection surface from the calculated point on the ray path.

11 Claims, 2 Drawing Sheets

(51) Int. Cl.
*G01C 3/00* (2006.01)
*G01S 17/08* (2006.01)
*G01S 17/931* (2020.01)
*G01S 17/48* (2006.01)

(52) U.S. Cl.
CPC ............ *G01S 17/48* (2013.01); *G01S 17/931* (2020.01); *G06T 2207/30261* (2013.01)

(56) References Cited

U.S. PATENT DOCUMENTS

2015/0294161 A1   10/2015  Schamp
2019/0344702 A1*  11/2019  Breuer .................... B60Q 1/06

FOREIGN PATENT DOCUMENTS

DE        102017117211 B3   9/2018
EP           2085744 B1   11/2016

* cited by examiner

METHOD FOR DISTANCE MEASUREMENT USING TRAJECTORY-BASED TRIANGULATION

CROSS REFERENCE TO RELATED APPLICATIONS

This application claims benefit to German Patent Application No. DE 10 2018 101 023.0, filed Jan. 18, 2018, which is hereby incorporated by reference herein.

FIELD

The present invention relates to a method for distance measurement using trajectory-based triangulation, in particular for use in a motor vehicle.

BACKGROUND

Many motor vehicles nowadays have a fixedly installed driver assistance camera (referred to as vehicle camera below), which is typically mounted in the upper region of the windshield. The vehicle camera is used in the implementation of diverse driver assistance systems, e.g. night view assist or lane keep assist systems, which are intended to assist the driver in specific driving situations. Among others, the vehicle camera can be used to implement distance measurement. In this process, referred to as active triangulation, a characteristic light pattern that is projected by the headlight of the vehicle is captured by the vehicle camera and evaluated. The projected light pattern is extracted from the image of the environment captured by the vehicle camera (referred to as the camera image below) by way of image processing means, and characteristic structures contained therein are assigned to the units of the headlight producing them. Ascertaining the correlation between characteristic structures of the light pattern and the units of the headlight producing them corresponds to solving the correspondence problem. Only once this correlation is known is it possible to ascertain, based thereon, the distance between vehicle and the projected characteristic light pattern using specific triangulation algorithms. However, prior to the active triangulation, which is initiated with the projection of the characteristic light pattern onto the area in front of the vehicle, a calibration of the stereo system of headlight and vehicle camera is performed. Only if the position and alignment of the headlight and of the vehicle camera are known is it possible to use this system for distance ascertainment.

When implementing the necessary image processing, numerous triangulation algorithms known from the prior art can be used. One of the triangulation algorithms that is used most frequently is based on what is known as the midpoint method (midpoint triangulation). In this method, the ray profile of the light emanating from the headlight (or ray profiles of the light emanating from units of the headlight) to a projection surface and the ray profile from the projection surface to the vehicle camera are determined, wherein the latter corresponds to capturing the light information by way of the vehicle camera. From the determination of the point of intersection of the two rays, the distance of the projection surface from the vehicle can be deduced. However, the point of intersection of said rays frequently does not exist owing to image processing and calibration errors. In order to nevertheless feasibly implement this method, the distance (i.e. the shortest connection) between the rays is calculated and declared to be the alleged point of intersection.

Since provision of distance data represents a highly safety-relevant process (not only but in particular in the area of autonomous driving), the active triangulation in the vehicle must continuously provide distance data without delay, i.e. be online-capable. The corresponding, typically complicated triangulation algorithms therefore must be implemented as efficiently as possible and operate in a resource-saving manner in order to meet this criterion.

SUMMARY

In an embodiment, the present invention provides a method for ascertaining a distance between a vehicle and a projection surface, onto which a characteristic light pattern is projected using a headlight of the vehicle, which light pattern is captured by an image capturing unit of the vehicle, the characteristic light pattern having characteristic structures that are produced in each case by a light-producing unit of the headlight. The method includes determining at least one three-dimensional ray path that describes propagation of light emanating from a first light-producing unit; and transforming the three-dimensional ray path to a two-dimensional trajectory into an image of the image capturing unit of the vehicle. Due to an associated transformation rule, points on the ray path are correlated with points on the trajectory. The method further includes detecting, in an image of the characteristic light pattern captured by the image capturing unit, a characteristic structure produced by the first light-producing unit by evaluating a geometric location relationship in the captured image between the trajectory and characteristic structures of a characteristic light pattern that are located in an environment along the trajectory; calculating a point on the ray path that is correlated with a position of the detected characteristic structure on the trajectory in accordance with the transformation rule; and calculating the distance between the vehicle and the projection surface from the calculated point on the ray path.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
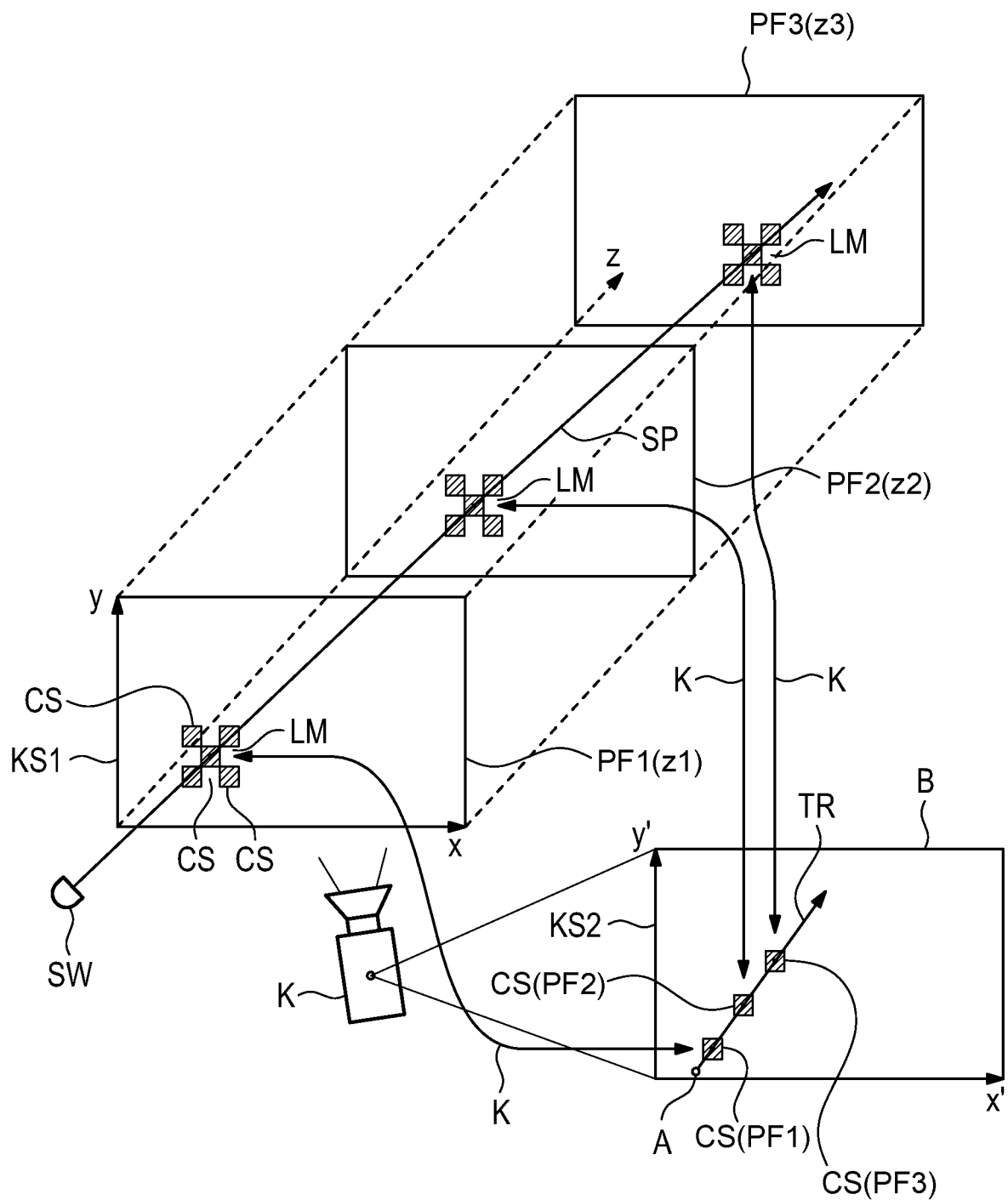
FIG. 1 shows a schematic diagram illustrating the starting scenario for applying a method according to an embodiment of the invention.

Embodiments of the invention provide methods for distance ascertainment for a vehicle, which reliably provides distance values in a resource-saving fashion.

Methods according to embodiments of the invention serve for ascertaining a distance between a vehicle and a projection surface, onto which a characteristic light pattern is projected using a headlight of the vehicle, which characteristic light pattern is captured by an image capturing unit of the vehicle. The characteristic light pattern in this case has characteristic structures, which correspond, for example, to bright (light-filled) polygonal areas, e.g. rectangles, in a chessboard pattern. Each characteristic structure can for its part have characteristic features, e.g. light-dark transitions (edges) or corner points.

Methods according to embodiments of the invention for distance measurement use trajectory-based triangulation performed on the basis of a correlation between distance-dependent positions of characteristic structures on their trajectory in an image, captured by an image capturing unit of a vehicle, of a characteristic light pattern that can be produced by the headlight of the vehicle, and positions of the characteristic structures on ray paths that correspond to light rays emanating from corresponding units of the headlight.

Methods according to embodiments of the invention are characterized in that the triangulation step is integrated in process steps which are performed, proceeding from the order of the process steps in the previously described classical method for distance ascertainment, in advance (such as calibration of the headlight vehicle camera system, detection of the characteristic light pattern in the image of the vehicle camera, and assigning the characteristic structures to the unit of the headlight), rather than said step being performed separately subsequently to these process steps. In said assignment of the characteristic structures to units of the headlight, the characteristic structures (or the characteristic features thereof) in the characteristic light pattern must first be detected. By way of example, the method disclosed in patent application DE 10 2017 117 211 A1 can be used herefor, in which the trajectories of characteristic features of the characteristic structures are used, i.e. pathways along which characteristic features in the image of the vehicle camera move in dependence on the distance between vehicle and projection surface. The trajectories are switched (projected) into the image of the vehicle camera, wherein a respective characteristic trajectory is assigned to each unit of the headlight. Characteristic features detected along a trajectory are then assigned to the associated characteristic structure, which in turn is assigned to the corresponding unit of the headlight. A unit of a headlight can be understood to mean a pixel or an LED for example of an LED matrix headlight, in which the LEDs are arranged in a matrix (in columns and rows).

In methods according to embodiments of the invention, distance determination is therefore already performed in the assignment of the characteristic structures to units of the headlight. This is possible because the position of a characteristic structure on the trajectory can be correlated with a distance of the vehicle from the characteristic structure of the light pattern that is projected onto a projection surface (any desired object in the scene of the vehicle). Since the trajectory, which in the image of the vehicle camera corresponds to a two-dimensional representation of the light ray emanating from an element of the headlight, is calculated on the basis of calibration data, there is a relationship/correlation between positions/points on the actual three-dimensional ray path of the light ray emitted by a unit of the headlight and positions/points on the associated trajectory. This correlation is also known as $\mu/\lambda$, relationship. The parameter p indicates the distance from the starting point of the trajectory to the position of the associated characteristic structure or of the associated characteristic feature on the trajectory in the image of the vehicle camera. The parameter $\lambda$ indicates the distance of a unit of the headlight or of a defined light exit point of the headlight (e.g. the focus thereof) from the position of the projection of the characteristic structure or the characteristic feature thereof on the projection surface. The parameter $\lambda$ consequently gives information relating to the position of the observed point on the three-dimensional ray path, from which the distance between vehicle and projection surface is ascertained. Accordingly, a calculation-intensive and consequently resource-consuming triangulation algorithm, which would calculate the headlight ray (illumination ray) and the vehicle camera ray (observation ray) on the basis of calibration data and would subsequently calculate the point of intersection between these two rays in the three-dimensional space, can be dispensed with. According to the present methods, the distances or depth values will already be ascertained during the process steps that, in the methods known in the prior art, are performed prior to the active triangulation and separately therefrom.

In methods according to embodiments of the invention, the detection and/or the assignment of the characteristic structures as such can be effected on the basis of a corresponding algorithm for example by way of detecting a specific number of characteristic features (e.g. light-dark transitions, corner points) of a characteristic structure. That is to say the detection of characteristic structures can be based on a detection of the associated characteristic features. Assigning a characteristic structure to the corresponding unit of the headlight can likewise include assigning at least one characteristic feature to the corresponding unit of the headlight. In this context, both terms can consequently be understood to be equivalent.

According to an embodiment of the invention, a method includes, in a first step, determining at least one three-dimensional ray path which describes the propagation of the light emanating from the associated light-producing unit. This process can correspond substantially to the calibration of the headlight, during which direction vectors are determined, along which light exits from the units of the headlight. For the calibration, a direct method can be used, in which the three-dimensional profile of the ray path is determined from the positions of the associated characteristic structure on the projection surface at different known distances between projection and vehicle. In other words, the ray paths can be ascertained by way of interpolation of the distance-dependent points of incidence of the light emanating from the corresponding light-producing unit on the projection surface. Due to the calibration, the focus (starting point) and the direction vector for each ray path in the vehicle coordinate system are known, also taking account of any headlight misalignment. At the same time, the parameter $\lambda$, which describes the distance of a point on the ray path from the starting point of the ray, can be determined in the course of the calibration. The parameter $\lambda$ can be directly correlated with a distance value from the varying distances between vehicle and projection surface set during the calibration. The final distance value to be calculated can refer to the rear axle of the vehicle, which can correspond to the reference point of the vehicle coordinate system.

In a further step, the method includes transforming the three-dimensional ray path to a two-dimensional trajectory into the image of the image capturing unit of the vehicle. Due to an associated transformation rule, points on the ray path are correlated with points on the trajectory ($\mu/\lambda$ relationship). Transformation can be effected on the basis of the starting point and of the direction vector of each ray path. These can be multiplied by a projection matrix so as to be projected into the image of the vehicle camera. This projection can correspond to a transfer of the ray path from the vehicle coordinate system to the coordinate system of the vehicle camera. Mathematically speaking, the projection matrix can be considered to be the product of a rotation matrix, a translation matrix and the intrinsic camera matrix, wherein the first two matrices reflect the location of the headlights in the vehicle coordinate system as external parameters and the intrinsic camera matrix describes the internal properties of the camera. Proceeding from the transformation rule, each point on the three-dimensional ray path can be converted by calculation to a point on the two-dimensional trajectory, with this correlation corresponding to the $\mu/\lambda$ relationship mentioned in the introductory part. Consequently, the transformation rule establishes a correlation between a point on the trajectory and the associated distance between vehicle and a projection surface on which a characteristic structure appears at the point of the trajectory in the captured camera image.

In a further step, the method includes detecting, in an image of the characteristic light pattern captured by the image capturing unit, the characteristic structure produced by the light-producing unit that is associated with the trajectory. This detecting can be effected by evaluating a geometric location relationship in the captured image between the trajectory and the characteristic structures of the characteristic light pattern that are located in an environment along the trajectory. In illustrative terms, this step involves a search in the captured image for the characteristic structure (or the characteristic features thereof) which is situated on or near or in the catchment area of the trajectory and which has been produced by the unit of the headlight that is associated with the relevant trajectory. Generally, this applies to only one characteristic structure of the characteristic light pattern, because there is always a one-to-one (bijective) relationship between trajectories that are associated with units of the headlight and the characteristic structures (as long as the characteristic structure can be detected by the image processing algorithm). If the detection of the characteristic structure is based on the detection of corner points or edges of the characteristic structure, these can also be assigned to a trajectory. Alternatively or in addition, the position of the associated detected characteristic structure on the trajectory can be determined, for example with respect to the center point of the geometric shape of the characteristic structure.

In a further step, the method can include calculating a point on the ray path which is correlated with the position of the detected characteristic structure on the trajectory in accordance with the transformation rule. The calculation can be performed on the basis of the above-mentioned transformation rule.

In yet a further step, the method can finally include calculating the distance between the vehicle and the projection surface from the calculated point on the ray path.

In accordance with a further embodiment of the invention, it is possible with the transformation rule, as already indicated above, to correlate a first parameter with a second parameter, wherein the first parameter indicates the distance of a point on the ray path from the position of the light-producing unit and the second parameter indicates the distance of a point on the trajectory from a starting point, the latter corresponding to the position of the associated light-producing unit in the image of the image capturing unit. The first parameter can be $\lambda$ and the second parameter can be $\mu$.

In accordance with a further embodiment of the invention, detecting the characteristic structure associated with the trajectory in the captured image of the characteristic light pattern can include calculating a detection mask and displacing the detection mask along the trajectory in the captured image so as to locate the corresponding characteristic structure. The corresponding characteristic structure is understood to mean the structure which is produced by the light of that element of the headlight to which the trajectory is considered. The size of the detection mask can be adapted to the size of a characteristic structure and be at least as large as the latter. The displacement of the detection mask along the trajectory can be effected in defined distances. Generally, the trajectory can be defined with respect to a point of the characteristic structure which is situated inside, for example the center point thereof, starting from the correspondingly calculated ray path. Alternatively, the trajectories can also be defined with respect to specific characteristic features of the characteristic structures, such as their corner points.

In accordance with a further embodiment of the invention, the characteristic light pattern can include a chessboard pattern, in which light-filled segments correspond to characteristic structures. Disregarding imaging distortions, the chessboard pattern can include an arrangement of dark and bright, i.e. light-filled, polygonal, for example approximately rectangular, segments arranged in alternation. The characteristic features can be corner points of the light-filled segments.

In accordance with a further embodiment of the invention, detecting of the characteristic structure associated with the trajectory in the captured image of the characteristic light pattern can include detecting characteristic features which are situated within the detection mask. Consequently, the corresponding detection algorithm can be set up for example for detecting light-dark transitions or corner points within a chessboard pattern in order to identify, based on these features, the bright segments of the chessboard pattern. In such a case, the detection mask is used to search the region around the trajectory for characteristic features which are potentially suitable, i.e. may belong to the characteristic structure in question. From this detected group of characteristic features, a number of the characteristic features can then be assigned to the characteristic structure associated with the trajectory if they are situated within the detection mask at the same time, if their number corresponds to a predetermined number; and if it is ascertained that this predetermined number of characteristic features defines a characteristic structure of the characteristic light pattern. Taking the scenario of corner points of bright segments in the chessboard pattern as characteristic features as an example, according to the required conditions, a search would be performed for four corner points which are situated, at a specific position of the detection mask along the trajectory, within the detection mask at the same time, said corner points being the top left, top right, bottom right and bottom left corner points of a bright segment. Using suitably formulated constraints, a plausibility check can prevent the algorithm from incorrectly declaring corner points of different bright segments as being those of a single bright segment or from detecting corner points around dark segments.

In accordance with a further embodiment of the invention, the method can furthermore include calculating a position of at least one corner point of the characteristic structure associated with the trajectory on said trajectory, wherein, for this ascertainment, either the initially determined three-dimensional profile of the ray path has been determined from positions of the corner point of a light-filled segment on the projection surface at different known distances between projection and vehicle, or the trajectory calculated with respect to the respective characteristic structure and the corner point are overlaid by parallel displacement relative to one another. That means that in the case that the trajectory for example with respect to the center point of the characteristic structure has been ascertained, this trajectory is considered to be approximately the trajectory of the corner points associated with said characteristic structure. Ascertainment of the distance of the corner points from the starting point of the trajectory can be effected by parallel displacement of the trajectory to the corner points or by projecting the corner points onto the trajectory, in each case by letting a perpendicular fall from a corner point onto the trajectory.

In accordance with a further aspect of the present invention, a motor vehicle having a vehicle camera and a distance ascertainment unit is provided, which is set up for performing the method described here. The distance ascertainment unit can represent a separate electronic module and be coupled to the internal vehicle electronics, or it can be implemented by a program module in the internal vehicle electronics.

FIG. 1 depicts the fundamental starting situation illustrating the mode of function of the method according to the invention. A headlight SW of a vehicle (not depicted) primarily serves for producing a light projection which serves for lighting the environment in front of the vehicle. To ascertain the distance, the light that is output by the headlight SW can be imprinted with a characteristic light pattern LM, which is depicted here in exemplary fashion as a chessboard pattern. The chessboard pattern is a good example, since it comes about naturally from the arrangement of the pixels in LED matrix headlights, which are customary nowadays. That is to say that each characteristic structure CS can be produced by a pixel of the LED matrix headlight. The structures CS of the characteristic light pattern LM here correspond to switched-on pixels of the headlight, while dark fields/regions between the structures CS correspond to switched-off pixels. However, it should be clear that the distance measurement can equally be implemented on the basis of other characteristic light patterns. In particular, the characteristic light pattern LM can be projected while normal light emission (e.g. low beam) is taking place. In such a case, the characteristic structures CS can differ from the typical light field by brightness values and for e.g. 20% darker or 20% brighter than the inactive fields of the characteristic light pattern LM. In general terms it is relevant that the characteristic light pattern LM has sufficiently brighter and darker regions so that for example characteristic features can be detected therein by way of an image processing algorithm. Here, the bright(er) or the dark(er) regions can have a brightness level that corresponds to the brightness of the current light function (e.g. low beam). The figures are based on the assumption that the hatched areas correspond to light-filled characteristic structures CS, which are brought about by light emission from the headlight SW, and the white areas which are located between them represent light-free (dark) regions, which are not lit by the headlight SW.

In the course of a calibration of the headlight SW of the vehicle, the images of the scene in front of the vehicle captured using a vehicle camera K are captured and evaluated. The characteristic light pattern LM is here projected, for example, onto a projection surface at different distances: a first projection surface PF1($z1$) at the distance $z1$ from the headlight SW (or the vehicle), a second projection surface PF2($z2$) at the distance $z2$ from the headlight SW and a third projection surface PF3($z3$) at the distance $z3$ from the headlight SW. The z-values $z1$, $z2$ and $z3$ can correspond to distances of the projection surfaces PF1, PF2 and PF3 from the vehicle and are known during the calibration of the headlight SW. The projection surfaces PF1, PF2, PF3 can be any surfaces, even for example a single surface, onto which the light or the characteristic light pattern LM is projected and whose distance z from the vehicle is varied. Indicated at the first projection surface PF1 is a first coordinate system KS1, which is intended to show that the position of the characteristic light pattern LM (and/or the characteristic structures CS thereof) on the projection surfaces PF1, PF2 and PF3 is ascertained in three-dimensional space. From the ascertained points in space, the associated ray path SP can be calculated by interpolation. The ray path SP depicted is here reconstructed with respect to the center point of the centrally arranged light-filled characteristic structure CS of the light pattern LM. Although the origin of the first coordinate system KS1 is shown in FIG. 1 on the first projection surface PF1, the profile of the ray path SP can be ascertained in deviation therefrom in the vehicle coordinate system.

The vehicle camera K captures the environment in front of the vehicle and images it in its image plane B, which is defined by a second coordinate system KS2, which is two-dimensional, and can correspond substantially to the plane of the image sensors. The position of the headlight SW and of the camera K and their relative alignment are known from the calibration. The characteristic structures CS are clearly all located, as viewed from the headlight SW, on one straight line, the ray path SP. However, as viewed by the camera K, which is fixedly mounted in the vehicle and is not varied during operation with respect to its position and orientation under normal circumstances, the characteristic light pattern LM, in particular a characteristic structure CS, is located at a different site depending on the distance of the vehicle from the projection surface PF1, PF2, PF3. Shown in the image plane B of the camera K are the distance-dependent positions of the characteristic structure CS, which is located centrally within the chessboard pattern and is considered by way of example.

Consequently, the image CS(PF2) of the projection of the central characteristic structure CS on the second projection surface PF2 in the image plane B is offset to the top right with respect to the image CS(PF1) of its projection onto the first projection surface PF1, which is closer to the headlight SW. In contrast, it is offset to the bottom left with respect to the image CS(PF3) of the projection of the central characteristic structure CS onto the third projection surface PF3, which is further away. This effect is well-known in epipolar geometry and occurs if one and the same object (in this case the projection of the characteristic structure CS) is viewed at different distances from two different positions (here camera K and headlight SW), wherein here the observation from the view of the headlight SW corresponds to the projection of the characteristic light pattern LM.

Based on the relationships illustrated in FIG. 1, it is initially possible in the course of the calibration of the headlight SW to ascertain with respect to each distance between vehicle and projection surface PF1, PF2, PF3 the position of a characteristic structure CS thereon. It is thus possible to calculate for each set distance the parameter λ, which describes the distance of the characteristic structure CS along the associated ray path SP from the headlight SW or its defined light exit point (focus).

Figure 2:
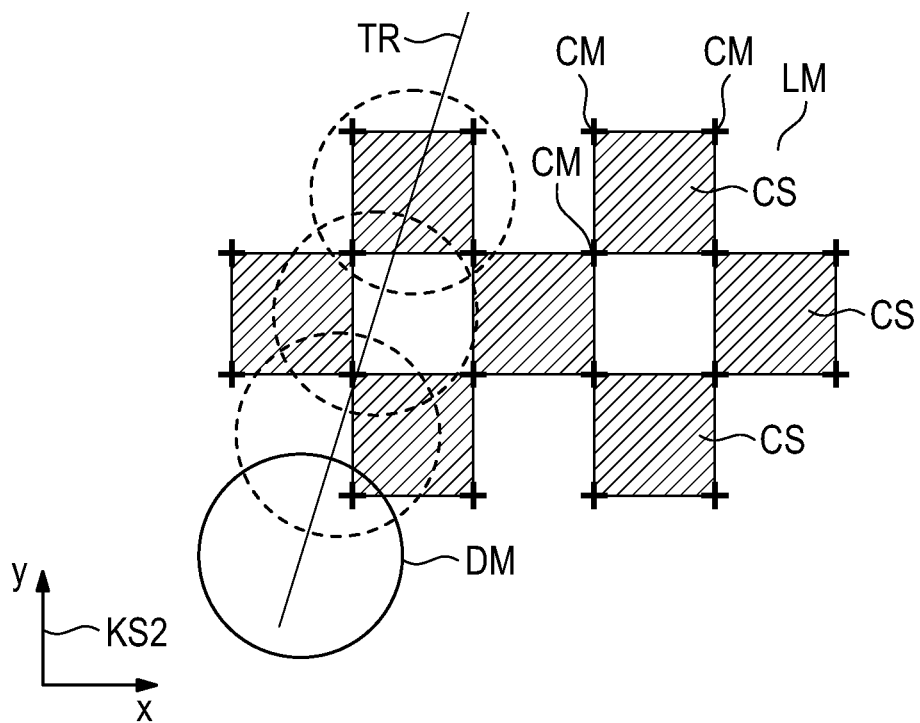
FIG. 2 illustrates the detection of the characteristic structure of an exemplary characteristic light pattern.
Figure 3:
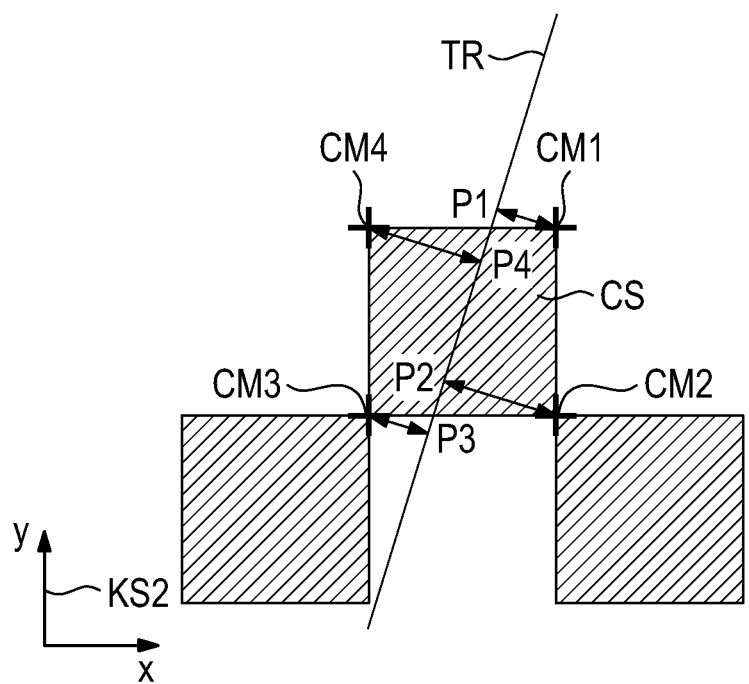
FIG. 3 illustrates the ascertainment of distances of characteristic features of a detected characteristic structure from the starting point of the trajectory.

The concrete distance determination on the basis of an image of the vehicle environment in which the characteristic light pattern LM is imaged (isolated or together with other objects which are located in the field of view of the vehicle camera K), captured using the vehicle camera K, will be explained below with reference to FIGS. 2 and 3. FIG. 2 illustrates a detail of a captured camera image, in which the characteristic light pattern LM is shown in the image plane B of the vehicle camera K (indicated by the second coordinate system KS2). The characteristic light pattern LM, analogously to FIG. 1, has characteristic structures CS, which are each defined by characteristic features CM in the form of corner points.

First, in the context of the method in accordance with the invention, the ray paths SP are transformed to the image plane B, which gives the corresponding trajectories TR. In FIG. 2, only one trajectory TR is depicted by way of example. The calculation of the trajectories which describe the distance-dependent paths of the characteristic structures CS in the image plane B of the vehicle camera K is effected with respect to a calibrated stereo system of headlight SW and camera K and consequently on the basis of the calibration data of the camera K and the headlight SW.

Next, a detection masque DM is determined, which is displaced along the trajectory TR (illustrated in FIG. 2 by way of dashed circles that migrate upwardly) so as to find the characteristic structure CS that is associated with the trajectory TR. In other words, the characteristic structure produced by the unit of the headlight SW that is associated with the trajectory is intended to be ascertained. At each position of the detection mask DM, first, corner points of the chessboard pattern are detected as the characteristic features CM. It should be noted that it is not clear at the stage of the method illustrated in FIG. 2 which detected corner points belong to which characteristic structure CS. Once the corner points along the trajectory TR have been detected, those that together define a characteristic structure CS are ascertained among them. This ascertainment is based on the premise that in the image captured by the camera exactly one characteristic structure CS exists that pertains to a respective trajectory TR. All other characteristic structures have slightly offset trajectories. In other words, it is determined which of the corner points detected in the local environment of the trajectory TR define an associated characteristic structure CS.

With appropriate constraints in the definition of the detection mask, four pertinent characteristic features CM, that is to say four pertinent corner points of a characteristic structure, are detected in the illustrated exemplary scenario: one top right, one top left, one bottom right and one bottom left corner of a characteristic structure CS. In this way it is in particular possible to ensure that the search algorithm detects characteristic structures CS and not the dark fields located between them. It can be seen in FIG. 2 that the upper left light segment of the characteristic light pattern LM is detected as the segment belonging to the depicted trajectory TR, because only in this position of the detection mask DM do four pertinent corner points lie within the detection mask. It should be appreciated that the described association by way of corresponding trajectories can also be done with respect to the other characteristic structure CS. In general, further association approaches can also be used, for example on the basis of Euclidean minimization methods.

After detection of the characteristic structure CS belonging to the trajectory TR, the associated distance of this structure CS on the trajectory TR from its starting point can be ascertained. In other words, the parameter λ can be determined. To this end, for example, as shown in FIG. 3, the orthogonal distance of the corner points CM1-CM4 of a characteristic structure CS from the trajectory TR can be ascertained. Consequently, a first distance point P1 for the first corner point CM1, a second distance point P2 for the second corner point CM2, a third distance point P3 for the third corner point CM3 and a fourth distance point P4 for the fourth corner point CM4 are ascertained on the trajectory TR. Alternatively, depending on the concrete implementation of the method, the location of the center point of the characteristic structure CS on or with respect to the trajectory can also be ascertained.

Once the distance points P1-P4 have been ascertained, the distance between headlight SW and the projection surface of the characteristic light pattern LM can be calculated using the μ/λ relationship. As is shown in FIG. 1, a correlation K between points on the ray path SP in the three-dimensional environment of the vehicle (determined by three coordinates x, y, z) and points on the trajectory in the two-dimensional image space of the vehicle camera K (determined by two coordinates x',y') was ascertained in advance, which corresponds to the μ/λ relationship. This relationship can be inverted, with the result that for each distance point P1-P4, the corresponding point on the ray path can be ascertained. This relationship is illustrated in FIG. 1 by the double-headed arrows K, which link the characteristic structures CS(PF1), CS(PF2), CS(PF3) of the image space B to the corresponding projection distances (z-component in the first coordinate system KS1) by way of the corresponding positions of the characteristic structures CS on the ray path SP. The distances between projection surface PF1, PF2, PF3 and headlight SW can finally be converted by calculation to distances between projection surface and rear axle of the vehicle, because the rear axle of the vehicle represents a reference for the vehicle coordinate system.

In summary, the distance between vehicle and projection surface can thus be ascertained on the basis of a correlation between points on the ray path SP and points on the trajectory TR. In particular, no additional subsequent triangulation step that is based on a mathematical calculation of two straight lines and is complicated in terms of calculation and consequently resource-consuming, is necessary herefor.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for ascertaining a distance between a vehicle and a projection surface, onto which a characteristic light pattern is projected using a headlight of the vehicle, which light pattern is captured by an image capturing unit of the vehicle, the characteristic light pattern having characteristic structures that are produced in each case by a light-producing unit of the headlight, the method comprising:
   determining at least one three-dimensional ray path that describes propagation of light emanating from a first light-producing unit;
   transforming the three-dimensional ray path to a two-dimensional trajectory into an image of the image capturing unit of the vehicle, wherein, due to an associated transformation rule, points on the ray path are correlated with points on the trajectory;
   detecting, in an image of the characteristic light pattern captured by the image capturing unit, a characteristic structure produced by the first light-producing unit by evaluating a geometric location relationship in the captured image between the trajectory and characteristic structures of a characteristic light pattern that are located in an environment along the trajectory;
   calculating a point on the ray path that is correlated with a position of the detected characteristic structure on the trajectory in accordance with the transformation rule; and
   calculating the distance between the vehicle and the projection surface from the calculated point on the ray path.

2. The method as claimed in claim 1, wherein a three-dimensional profile of the ray path is determined from positions of the associated characteristic structure on the projection surface at different known distances between projection and vehicle.

3. The method as claimed in claim 1, wherein, for calculating the trajectory in the image of the image capturing unit, the position of the light-producing unit and a direction vector, which describes the profile of the ray path, are ascertained.

4. The method as claimed in claim 3, wherein, with the transformation rule, a first parameter is correlated with a second parameter, wherein the first parameter indicates a distance of a point on the ray path from the position of the light-producing unit and the second parameter indicates a distance of a point on the trajectory from a starting point, the latter corresponding to a position of the associated light-producing unit in the image of the image capturing unit.

5. The method as claimed in claim 1, wherein detecting the characteristic structure associated with the trajectory in the captured image of the characteristic light pattern includes:
   calculating a detection mask; and
   displacing the detection mask along the trajectory in the captured image to locate the corresponding characteristic structure.

6. The method according to claim 1, wherein the characteristic light pattern includes a chessboard pattern, in which each light-filled segment corresponds to a characteristic structure.

7. The method as claimed in claim 5, wherein detecting the characteristic structure associated with the trajectory in the captured image of the characteristic light pattern includes detecting characteristic features which are situated within the detection mask.

8. The method as claimed in claim 7, wherein detected characteristic features are assigned to the characteristic structure associated with the trajectory:
   i) if they are situated within the detection mask at the same time;
   ii) if their number corresponds to a predetermined number; and
   ii) if it is ascertained that this predetermined number of characteristic features defines a characteristic structure of the characteristic light pattern.

9. The method as claimed in claim 6, wherein the characteristic features are corner points of the light-filled segments.

10. The method as claimed in claim 9, furthermore including:
    calculating a position of at least one corner point of the characteristic structure associated with the trajectory on the trajectory;
    wherein, for this ascertainment:
    either the initially determined three-dimensional profile of the ray path has been determined from positions of the corner point of a light-filled segment on the projection surface at different known distances between projection and vehicle, or the trajectory calculated with respect to the respective characteristic structure and the corner point are overlaid by parallel displacement relative to one another.

11. A motor vehicle having a vehicle camera and a distance ascertainment unit, which is set up for performing the method as claimed in claim 1.

* * * * *